United States Patent
Guo et al.

(10) Patent No.: US 10,923,146 B1
(45) Date of Patent: Feb. 16, 2021

(54) DATA STORAGE DEVICE EMPLOYING TRIANGLE-LIKE DITHER TO SPREAD TRACK SQUEEZE

(71) Applicant: Western Digital Technologies, Inc., San Jose, CA (US)

(72) Inventors: Guoxiao Guo, Irvine, CA (US); Edgar D. Sheh, Cupertino, CA (US); Kei Yasuna, Kanagawa (JP); Due H. Banh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/894,665

(22) Filed: Jun. 5, 2020

(51) Int. Cl.
*G11B 5/54* (2006.01)
*G11B 5/58* (2006.01)
*G11B 5/596* (2006.01)
*G11B 20/12* (2006.01)

(52) U.S. Cl.
CPC ...... *G11B 5/59688* (2013.01); *G11B 20/1258* (2013.01)

(58) Field of Classification Search
CPC ............ G11B 5/59666; G11B 5/59661; G11B 5/59638; G11B 5/5543; G11B 5/5526; G11B 5/55; G11B 11/10578; G11B 5/59644; G11B 5/5547; G11B 5/54; G11B 5/58
USPC .......................................................... 360/75
See application file for complete search history.

(56) References Cited

U.S. PATENT DOCUMENTS

| | | | |
|---|---|---|---|
| 6,476,995 B1 | 11/2002 | Liu et al. | |
| 6,490,234 B1 * | 12/2002 | Okamoto | G11B 7/094 369/44.25 |
| 6,606,214 B1 | 8/2003 | Liu et al. | |
| 6,952,320 B1 | 10/2005 | Pollock et al. | |
| 7,330,322 B2 | 2/2008 | Hanson et al. | |
| 7,639,447 B1 | 12/2009 | Yu et al. | |
| 8,717,704 B1 * | 5/2014 | Yu | G11B 5/58 360/77.01 |
| 8,743,495 B1 | 6/2014 | Chen et al. | |
| 8,749,904 B1 | 6/2014 | Liang et al. | |
| 9,001,454 B1 * | 4/2015 | Kim | G11B 5/5547 360/77.04 |
| 9,142,235 B1 * | 9/2015 | Babinski | G11B 5/596 |
| 2003/0218814 A9 | 11/2003 | Min et al. | |

OTHER PUBLICATIONS

Anonymous, "Triangle Wave," Retrieved from the Internet: https://en.wikipedia.org/wiki/Triangle_wave, last edited Mar. 11, 2020.

* cited by examiner

*Primary Examiner* — Nabil Z Hindi (57) ABSTRACT

A data storage device is disclosed comprising a head actuated over a disk. The head is used to read servo information from the disk and generate a position error signal (PES) representing a position of the head over the disk. A control signal is generated based on the PES and a triangle-shape dither signal, and the head is positioned over the disk using the control signal.

19 Claims, 6 Drawing Sheets

$$x_{\text{triangle}}(t) = \frac{8}{\pi^2} \sum_{i=0}^{M-1} (-1)^i n^{-2} \sin(2\pi f_0 n t)$$

DATA STORAGE DEVICE EMPLOYING TRIANGLE-LIKE DITHER TO SPREAD TRACK SQUEEZE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
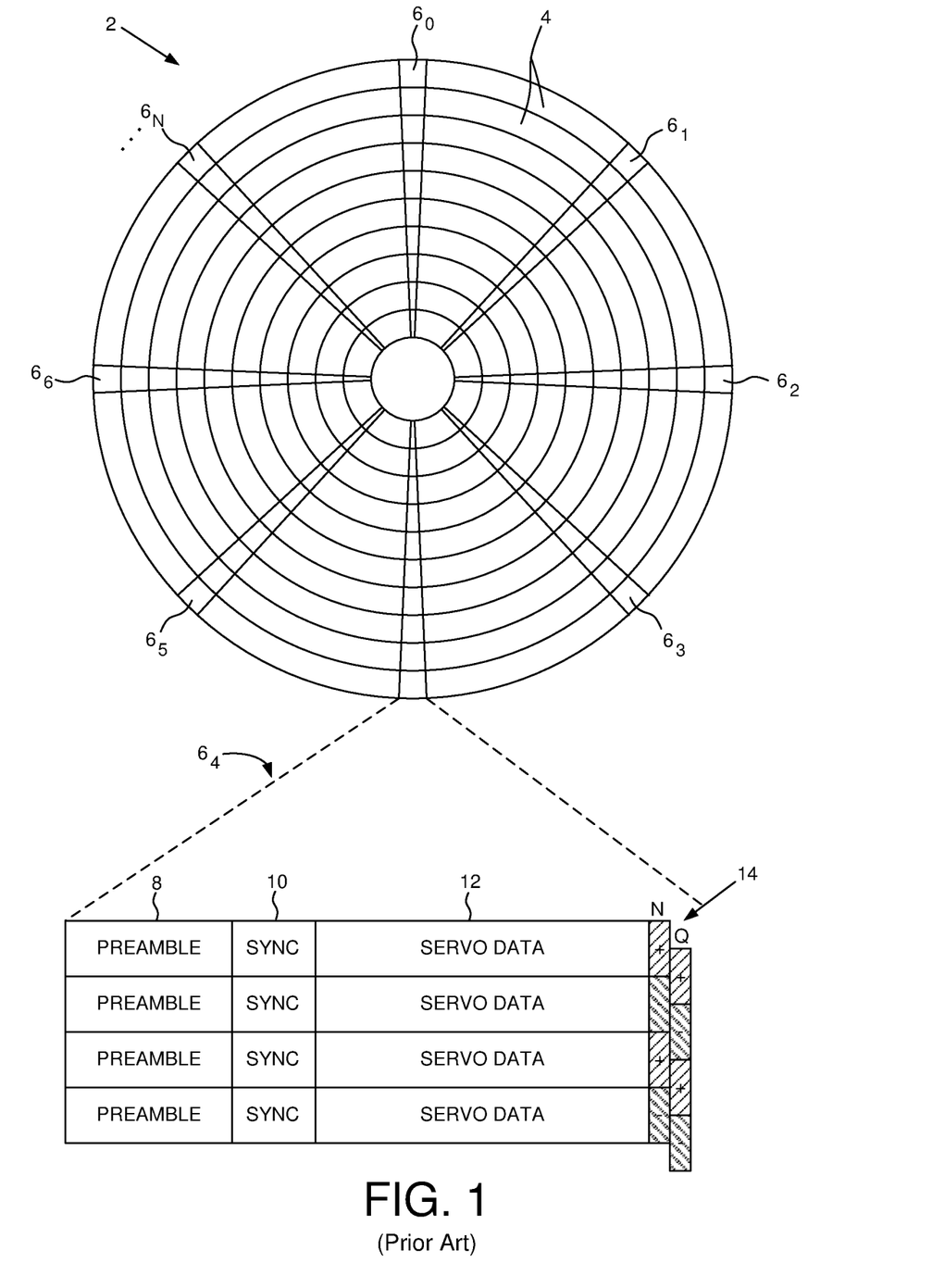
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
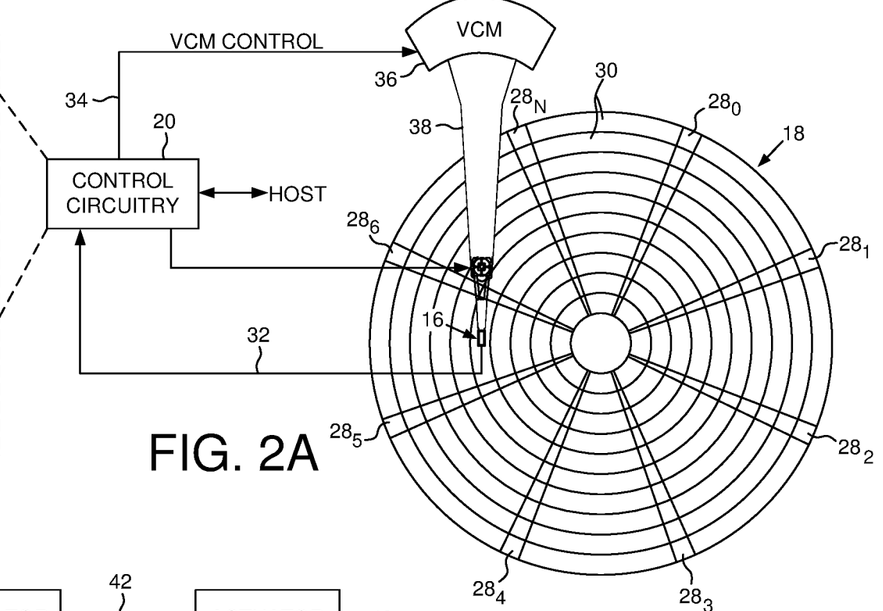
FIGS. 2A and 2B show a data storage device in the form of a disk drive comprising a head positioned over a disk using a triangle-shape dither signal.
Figure 2B:
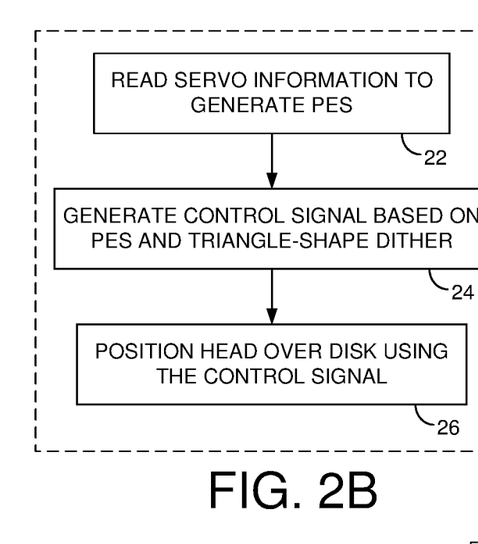

FIGS. 2A and 2B show a data storage device in the form of a disk drive according to an embodiment comprising a head 16 actuated over a disk 18. The disk drive further comprises control circuitry 20 configured to execute the flow diagram of FIG. 2B, wherein the head is used to read servo information from the disk and generate a position error signal (PES) representing a position of the head over the disk (block 22). A control signal is generated based on the PES and a triangle-shape dither signal (block 24), and the head is positioned over the disk using the control signal (block 26).

In the embodiment of FIG. 2A, the disk 18 comprises a plurality of servo sectors $28_0$-$28_N$ that define a plurality of servo tracks, wherein data tracks 30 are defined relative to the servo tracks at the same or different radial density. The control circuitry 20 processes a read signal 32 emanating from the head to demodulate the servo sectors and generate a position error signal (PES) representing an error between the actual position of the head and a target position relative to a target track. A servo control system in the control circuitry 20 filters the PES using a suitable compensation filter to generate a control signal 34 applied to a coarse actuator 36 (e.g., VCM) which rotates an actuator arm 38 about a pivot in order to actuate the head radially over the disk in a direction that reduces the PES. The head may also be servoed using a fine actuator, such as a piezoelectric (PZT) actuator, configured to actuate a suspension relative to the actuator arm 38, and/or configured to actuate the head relative to the suspension. The servo sectors $28_0$-$28_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2C:
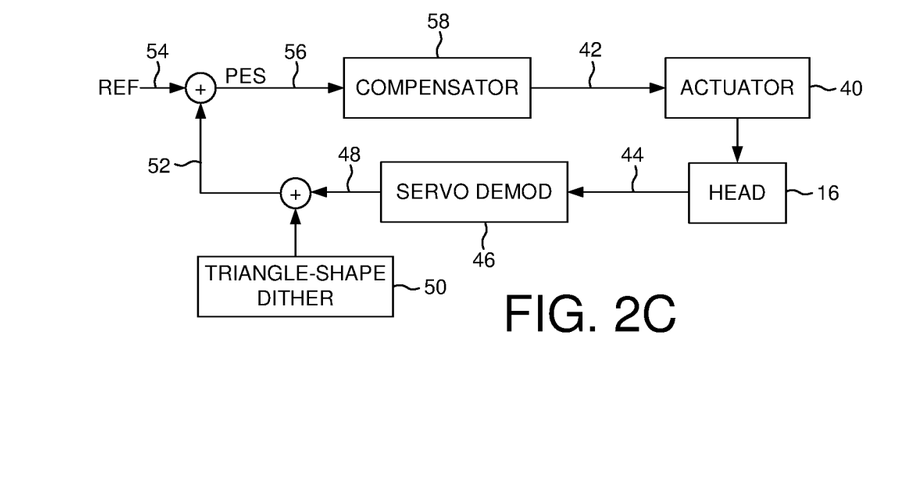
FIG. 2C shows control circuitry according to an embodiment wherein the triangle-shape dither signal is injected into a servo control system.

FIG. 2C shows a servo control system according to an embodiment wherein an actuator 40 (e.g., a course actuator and/or fine actuator) is controlled by a control signal 42 to position the head 16 over the disk 18. The head 16 reads servo information recorded on the disk 18 to generate a read signal 44 which is demodulated by a suitable servo demodulator 46 into an estimated position 48 of the head 16 relative to the disk 18. A triangle-shape dither signal 50 is combined with the estimated position 48 to generate an adjusted position signal 52 which is subtracted from a reference signal 54 to generate a position error signal (PES) 56. The PES 56 is filtered using any suitable compensator 58 in order to generate the control signal 42. In different embodiments described below, during access operations the triangle-shape dither signal 50 may cause the head to follow a substantially non-circular data track or follow a substantially circular data track relative to a rotation axis of the disk. In either case, in one embodiment the triangle-shape dither signal 50 causes the head 16 to cross multiple of the servo tracks during the access operation.

In one embodiment, having the head 16 cross multiple of the servo tracks during an access operation improves the performance of the servo control system, for example, by compensating for a misalignment of the servo tracks referred to as track squeeze. That is, there may be a transient decrease in the spacing between the servo tracks (track squeeze) over a relatively small band of the servo tracks (e.g., two adjacent servo tracks). The track squeeze may manifest over the entire circumference of the adjacent servo tracks, or it may manifest over shorter segments of the adjacent servo tracks. Regardless, the track squeeze may reduce the fidelity of the servo information read from the servo sectors, thereby decreasing the performance of the servo control system. In one embodiment, the track squeeze of adjacent tracks may be ameliorated by having the head 16 cross multiple of the servo tracks during an access operation, thereby "spreading out" the undesirable effect of the track squeeze.

Figure 3:
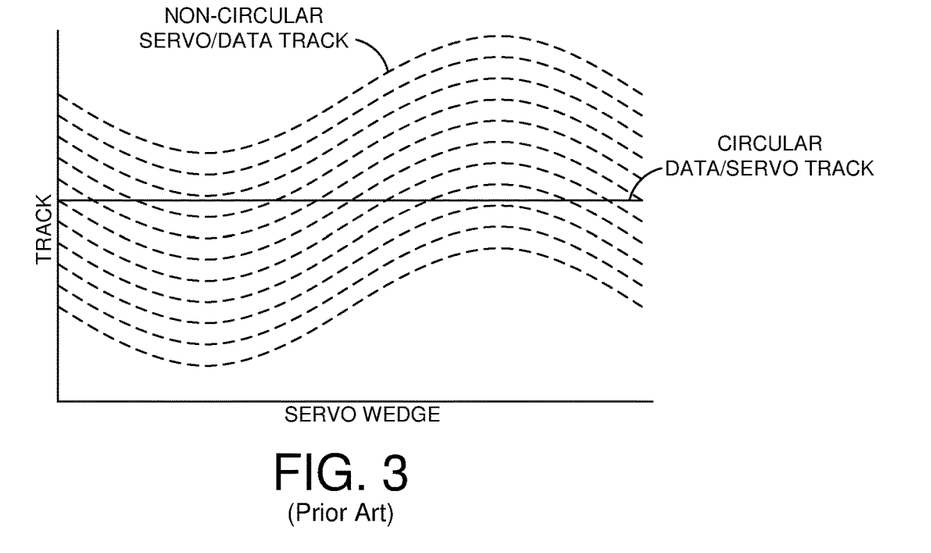
FIG. 3 shows a prior art technique for positioning a head over a disk using a sinusoidal dither signal.

FIG. 3 shows a prior art technique wherein a sinusoidal dither signal is injected into the servo control system in order to define a sinusoidal trajectory for either the servo tracks or the data tracks. For example, when the servo sectors are written to define substantially circular servo tracks relative to the rotation axis of the disk which is represented as a straight line in FIG. 3, the data tracks are defined to be non-circular (sinusoidal trajectory) so that the head crosses multiple of the servo tracks during an access operation. Conversely when the servo sectors are written to define non-circular servo tracks (sinusoidal servo tracks), the data tracks are defined to be substantially circular relative to the rotation axis of the disk so that the head crosses multiple of the servo tracks during an access operation. Additional details of the prior art technique shown in FIG. 3 are disclosed in U.S. Pat. No. 8,717,704 entitled "DISK DRIVE DEFINING NON-CIRCULAR DATA TRACKS RELATIVE TO ROTATION AXIS OF THE DISK," and in U.S. Pat. No. 8,749,904 entitled "DISK DRIVE COMPENSATING FOR TRACK SQUEEZE BY WRITING NON-CIRCULAR SERVO TRACKS," the disclosures of which are incorporated herein by reference.

Figure 4A:
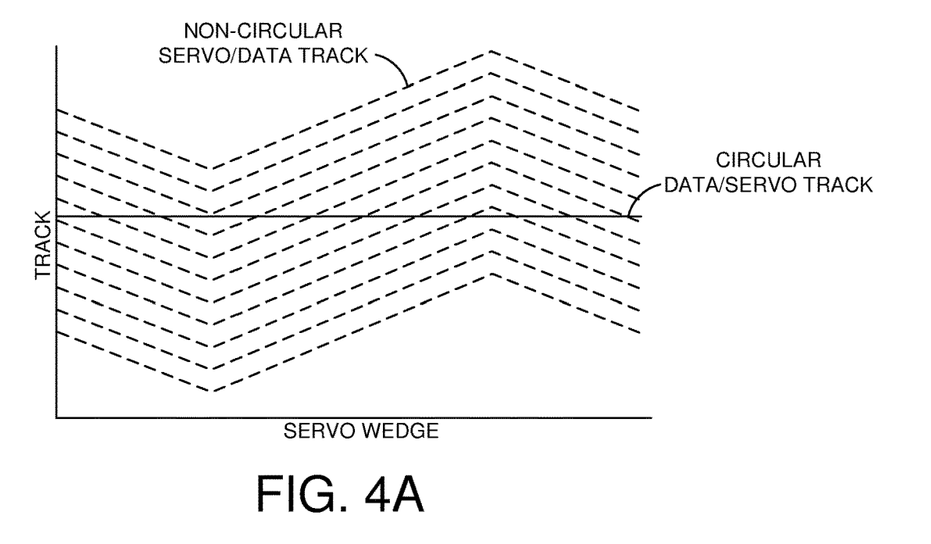
FIG. 4A shows an embodiment wherein the triangle-shape dither signal reduces the number of low-velocity servo track crossings as compared to a sinusoidal dither signal.
Figure 4B:
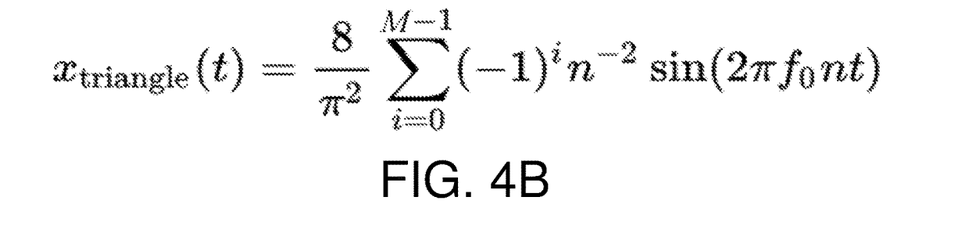
FIG. 4B shows an embodiment wherein the triangle-shape dither signal is generated by summing a plurality of odd harmonics of a fundamental frequency of a triangle wave.

Whether the servo tracks or the data tracks are defined to be non-circular in the prior art technique shown in FIG. 3, the sinusoidal dither signal reduces the servo track crossing velocity when the head is near the maxima and minima of the sinusoidal trajectory. Accordingly in one embodiment the sinusoidal dither signal shown in FIG. 3 is replaced with a triangle-shape dither signal, such as shown in FIG. 4A, so that the servo track crossing velocity remains substantially constant. In this manner, the performance improvement due to the head crossing multiple servo tracks (e.g., spreading servo track squeeze) is realized along the entire length of the data tracks. The triangle-shape dither signal may be generated in any suitable manner, wherein in one embodiment it is generated by summing a plurality of odd harmonics of a fundamental frequency of a triangle wave as shown in the equation of FIG. 4B. In FIG. 4B, $f_o$ represents the desired frequency of the triangle-shape dither signal, i represents the odd harmonic number where n=2i+1, and M represents the number of harmonics to include in the approximation (converges to perfect triangle wave as M tends to infinity).

Figure 5A:
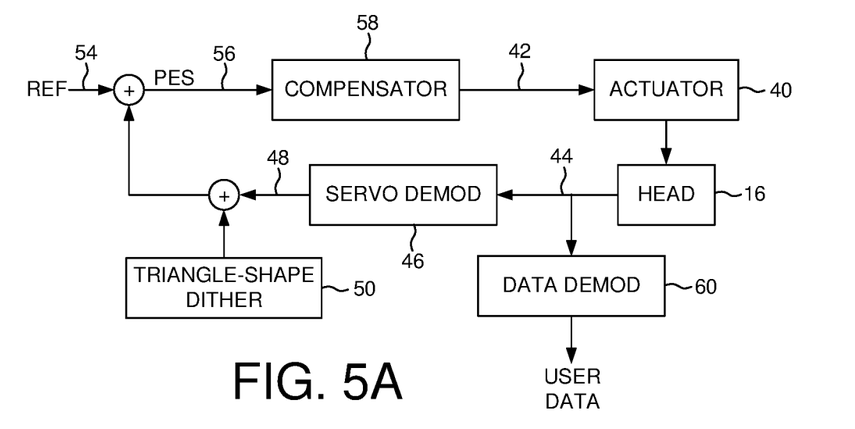
FIG. 5A shows control circuitry according to an embodiment wherein the triangle-shape dither signal is injected into a servo control system that positions the head during an access operation (write or read operation).

FIG. 5A shows a servo control system similar to FIG. 2C, wherein in this embodiment the servo sectors are written to define substantially circular servo tracks relative to a rotation axis of the disk (e.g., straight line in FIG. 4A), and the trajectory of the data tracks are defined relative to the servo tracks to follow the triangle-shape dither signal 50. That is, during write operations the head 16 follows the triangle-shape trajectory shown in FIG. 4A while writing to a data track. During read operations, the head 16 follows the same triangle-shape trajectory of the data track to generate the read signal 44 which is demodulated by any suitable data demodulator 60. The triangle-shape trajectory of the data tracks is achieved in this embodiment by adding the triangle-shape dither signal 50 to the estimated position 48 of the head 16 during the access operation.

Figure 5B:
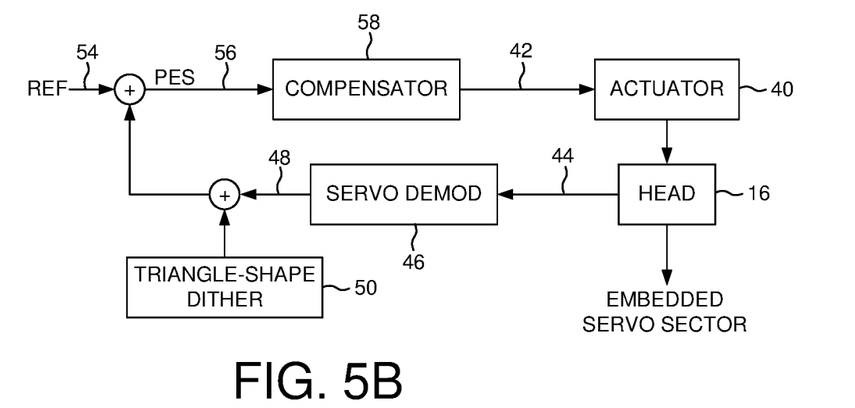
FIG. 5B shows control circuitry according to an embodiment wherein the triangle-shape dither signal is injected into a servo control system that positions the head while servo writing embedded servo sectors to the disk.

FIG. 5B shows a servo control system similar to FIG. 2C, wherein in this embodiment the servo sectors are written to define substantially non-circular servo tracks relative to the rotation axis of the disk (e.g., follow the triangle-shape trajectory shown in FIG. 4A), whereas the data tracks are defined to be substantially circular relative to the rotation axis of the disk (e.g., straight line in FIG. 4A). When writing the embedded servo sectors, the triangle-shape trajectory of the servo tracks is achieved in this embodiment by adding the triangle-shape dither signal 50 to the estimated position 48 of the head 16 while servo-writing the embedded servo sectors. When performing a normal access operation (write or read), the servo control system of FIG. 5A is used to control the position of the head except that the triangle-shape dither signal 50 is subtracted from the estimated position 48 so that the head 16 follows a substantially circular data track (e.g., straight line shown in FIG. 4A).

Figure 5C:
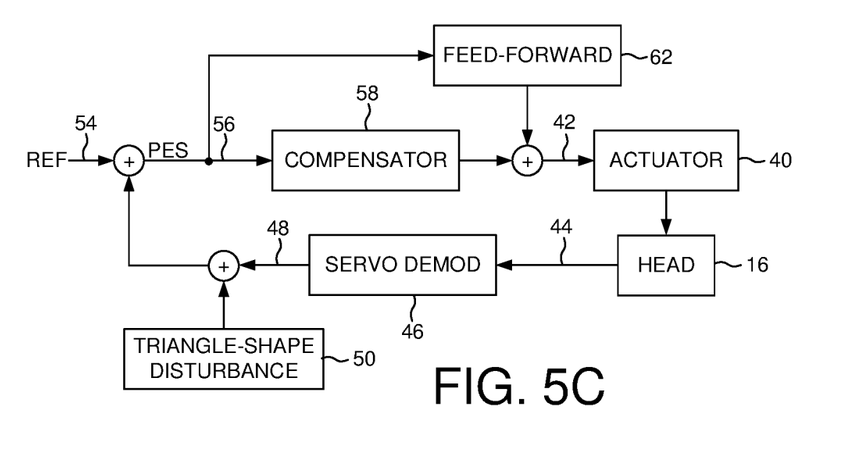
FIG. 5C shows control circuitry according to an embodiment wherein a servo control system further comprises feed-forward compensation to improve the efficacy of the triangle-shape dither signal.

FIG. 5C shows a servo control system according to an embodiment similar to the servo control systems described above with the addition of a feed-forward compensation 62 that improves the ability of the head to follow the target trajectory. In one embodiment, the feed-forward compensation 62 may be generated by adapting coefficients of one or more sinusoids until the PES 56 is minimized (e.g., during a servo writing operation or during an access operation). In this manner, the feed-forward compensation 62 learns the effect of injecting the triangle-shape dither signal 50 so that the final trajectory of the head 16 more closely follows the target trajectory. The feed-forward compensation 62 may also compensate for other repeatable disturbances in the servo control system, such as a repeatable runout of the servo information.

Figure 6A:
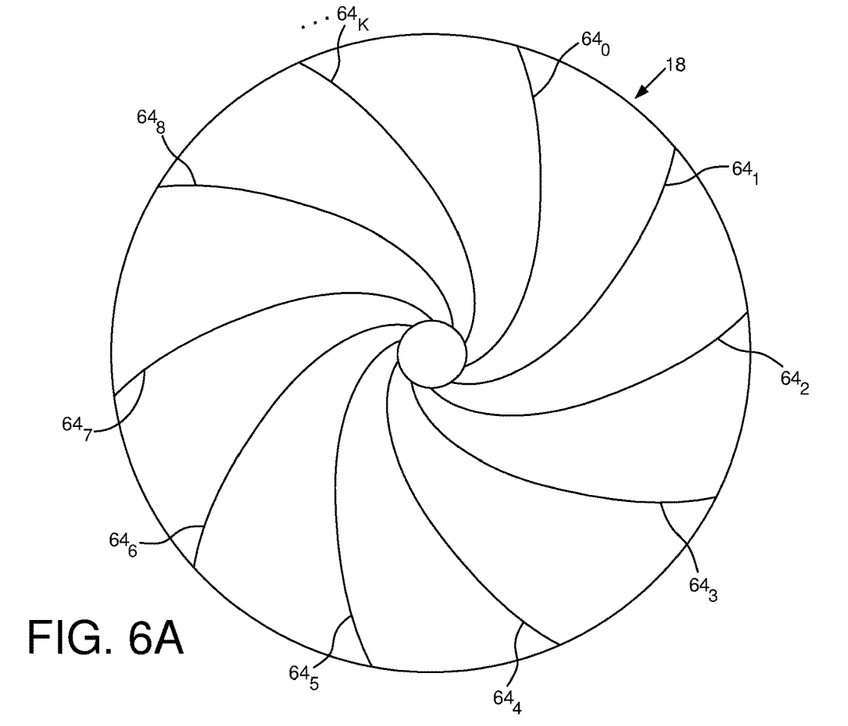
FIG. 6A shows an embodiment wherein the control circuitry reads reference servo information (e.g., spiral tracks) from the disk in order to write embedded servo sectors to the disk.
Figure 6B:
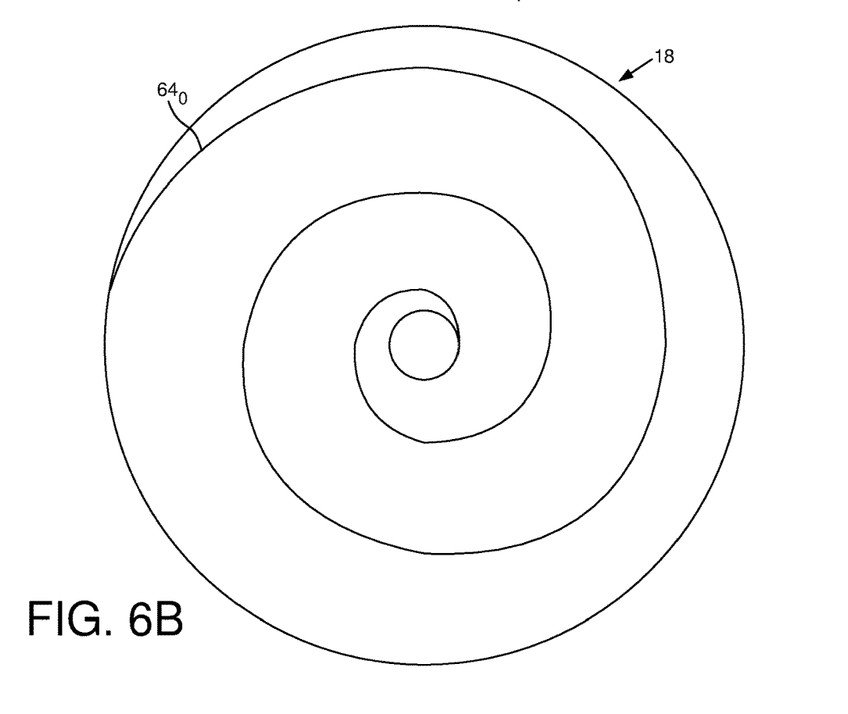
FIG. 6B shows an embodiment wherein each spiral track is written over multiple disk revolutions.

When servo writing the embedded servo sectors using the servo control system of FIG. 5B, in one embodiment the position of the head 16 is measured by reading a reference pattern from the disk 18. Any suitable reference pattern may be read from the disk 18, such as a plurality of spiral tracks $64_0$-$64_K$ as shown in the embodiment of FIG. 6A. In one embodiment, each spiral track $64_i$ is written on the disk 18 by moving the head 16 at a substantially constant velocity over the disk 18 while writing a high frequency signal periodically interrupted by a sync mark. When servoing the head 16 while writing the servo sectors $28_0$-$28_N$ on the disk 18, the position of the head 16 may be measured by evaluating the spiral track crossing signal relative to the sync marks. In the embodiment of FIG. 5A, each spiral track $64_i$ is written over a partial disk revolution, whereas in other embodiments each spiral track $64_i$ may be written over multiple disk revolutions as shown in the example of FIG. 6B.

In one embodiment, the reference pattern on the disk 18 may be non-circular relative to the rotation axis of the disk 18. For example, in the embodiment where the reference pattern comprises spiral tracks, the spiral tracks may define a non-circular path relative to the rotation axis of the disk 18 (referred to as repeatable runout) due, for example, to errors when writing the spiral tracks $64_0$-$64_K$ on the disk 18. In one embodiment, the repeatable runout of the reference pattern (e.g., spiral tracks) may be learned by the servo writer prior to writing the servo sectors on the disk. The triangle-shape dither signal 50 induced into the servo control system may then be adjusted based on the learned repeatable runout of the reference pattern. For example, in one embodiment the repeatable runout may be canceled by subtracting it from servo track trajectory defined by the triangle-shape dither signal 50. In this manner, the data tracks defined by the servo sectors $28_0$-$28_N$ follow a substantially circular trajectory (e.g., straight line of FIG. 4A) which minimizes the servo control effort during access operations.

Figure 7:
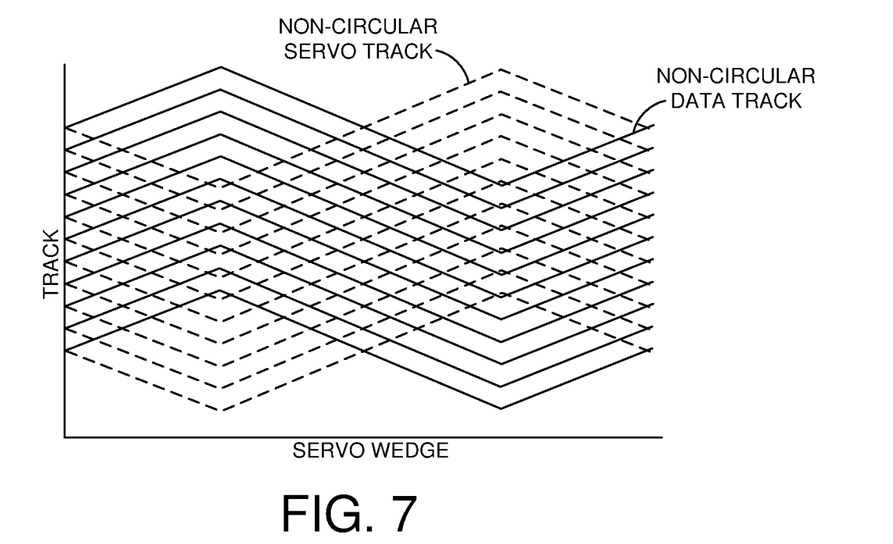
FIG. 7 shows an embodiment wherein both the servo tracks and the data tracks follow triangle-shape trajectories.

FIG. 7 shows an embodiment wherein the servo sectors $28_0$-$28_N$ are written so as to define the servo tracks along a triangle-shape trajectory determined by a first triangle-shape dither signal (e.g., using the servo control system of FIG. 5B), and the data tracks are defined so as to follow a triangle-shape trajectory determined by a second triangle-shape dither signal (e.g., using the servo control system of FIG. 5A). In the embodiment of FIG. 7, the triangle-shape trajectories of the servo tracks and data tracks are phase offset by 180 degrees so as to maximize the servo track crossing velocity of the head 16 during access operations. This embodiment may improve the fidelity of the servo writing process by reducing the amplitude of the triangle-shape dither signal and corresponding radial velocity of the head 16, while still achieving the desired servo track crossing velocity during access operations.

Figure 8:
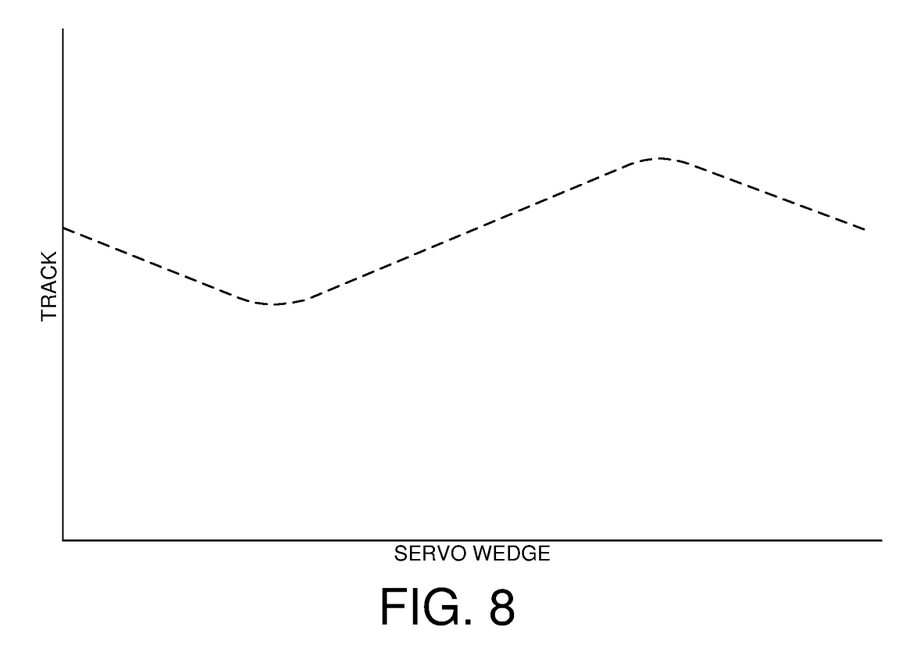
FIG. 8 shows an embodiment wherein the triangle-shape dither signal estimates a triangle wave by limiting the number of odd harmonics of the fundamental frequency of the triangle wave.

In the embodiments described above, the triangle-shape dither signal is shown as a triangle wave. In other embodiments, the triangle-shape dither signal may be generated as an approximation to a triangle wave, such as by limiting the number of odd harmonics (represented by M) in the equation of FIG. 4B. FIG. 8 shows an example triangle-shape dither signal generated as an approximation of a triangle wave which shows how the servo track crossing velocity of the head is reduced near the maxima and minima. However, the reduction in the servo track crossing velocity occurs over a short period of time as compared to the sinusoidal dither signal shown in FIG. 3, thereby improving the performance of the servo control system during access operations (e.g., by spreading servo track squeeze).

The triangle-shape dither signal(s) in the above described embodiments may be generated with any suitable amplitude in order to achieve a desired servo track crossing velocity of the head during access operations. In addition, the triangle-shape dither signal may be generated at any suitable frequency relative to the rotation frequency of the disk. In one embodiment, the triangle-shape dither signal may be generated to match the rotation frequency of the disk such that the triangle-shape trajectory of the servo or data tracks shown in FIG. 4A may represent a single revolution of the disk (i.e., the 1× frequency). In other embodiments, the triangle-shape dither signal(s) may be generated at a higher frequency, such as 2×, 3×, etc. the rotation frequency of the disk.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head actuated over the disk; and
    control circuitry configured to:
        use the head to read servo information from the disk and generate a position error signal (PES) representing a radially position of the head over the disk;
        generate a control signal based on the PES and a triangle-shape dither signal; and
        position the head radially over the disk using the control signal,
        wherein during an access operation the triangle-shape dither signal causes the head to cross multiple servo tracks on the disk at a substantially constant velocity, thereby spreading out an effect of track squeeze of the servo tracks.

2. The data storage device as recited in claim 1, wherein the control circuitry is further configured to generate the triangle-shape dither signal by generating a plurality of odd harmonics of a fundamental frequency of a triangle wave.

3. The data storage device as recited in claim 1, wherein:
    the disk comprises a plurality of servo sectors defining a plurality of servo tracks;
    the control circuitry is further configured to position the head over a data track using the control signal in order to access the data track; and
    the triangle-shape dither signal causes the data track to cross multiple of the servo tracks.

4. The data storage device as recited in claim 3, wherein the data track is substantially non-circular relative to a rotation axis of the disk.

5. The data storage device as recited in claim 4, wherein the triangle-shape dither signal causes the head to follow the substantially non-circular data track.

6. The data storage device as recited in claim 4, wherein the servo tracks are substantially circular relative to a rotation axis of the disk.

7. The data storage device as recited in claim 3, wherein the data track is substantially circular relative to a rotation axis of the disk.

8. The data storage device as recited in claim 7, wherein the triangle-shape dither signal causes the head to follow the substantially circular data track.

9. The data storage device as recited in claim 7, wherein the servo tracks are substantially non-circular relative to a rotation axis of the disk.

10. The data storage device as recited in claim 1, wherein the control circuitry is further configured to write servo sectors to the disk using the control signal to define a plurality of servo tracks, wherein the triangle-shape dither signal causes each servo track to be substantially non-circular relative to a rotation axis of the disk.

11. The data storage device as recited in claim 10, wherein the control circuitry is further configured to position the head over a data track in order to access the data track, wherein the triangle-shape dither signal causes the data track to cross multiple of the servo tracks.

12. A data storage device comprising:
    a disk;
    a head actuated over the disk; and
    control circuitry configured to:
        generate a triangle-shape dither signal; and
        write servo sectors to the disk using the triangle-shape dither signal to define a plurality of servo tracks, wherein the triangle-shape dither signal causes each servo track to be substantially non-circular relative to a rotation axis of the disk,
        wherein during an access operation the triangle-shape dither signal causes the head to cross multiple of the servo tracks at a substantially constant velocity, thereby spreading out an effect of track squeeze of the servo tracks.

13. The data storage device as recited in claim 12, wherein the control circuitry is further configured to generate the triangle-shape dither signal by generating a plurality of odd harmonics of a fundamental frequency of a triangle wave.

14. The data storage device as recited in claim 12, wherein the control circuitry is further configured to:
    generate a control signal based on the triangle-shape dither signal; and
    position the head over a data track using the control signal in order to access the data track, wherein the triangle-shape dither signal causes the data track to cross multiple of the servo tracks.

15. The data storage device as recited in claim 14, wherein the data track is substantially circular relative to a rotation axis of the disk.

16. The data storage device as recited in claim 14, wherein the data track is substantially non-circular relative to a rotation axis of the disk.

17. A data storage device comprising:
    a disk;
    a head actuated over the disk; and
    a means for positioning the head radially over the disk based on a triangle-shape dither signal,
    wherein during an access operation the triangle-shape dither signal causes the head to cross multiple servo tracks on the disk at a substantially constant velocity, thereby spreading out an effect of track squeeze of the servo tracks.

18. The data storage device as recited in claim 17, further comprising a means for writing servo sectors to the disk while positioning the head over the disk based on the triangle-shape dither signal.

19. The data storage device as recited in claim 17, further comprising a means for accessing the disk while positioning the head over the disk based on the triangle-shape dither signal.

* * * * *

UNITED STATES PATENT AND TRADEMARK OFFICE
CERTIFICATE OF CORRECTION

| | | |
|---|---|---|
| PATENT NO. | : 10,923,146 B1 | Page 1 of 1 |
| APPLICATION NO. | : 16/894665 | |
| DATED | : February 16, 2021 | |
| INVENTOR(S) | : Guo et al. | |

It is certified that error appears in the above-identified patent and that said Letters Patent is hereby corrected as shown below:

On the Title Page

Item (72), "Due H. Banh," is replaced with --Duc H. Banh,--.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*